(12) United States Patent
Narumi et al.

(10) Patent No.: US 8,736,852 B2
(45) Date of Patent: May 27, 2014

(54) APPARATUS FOR FORMING AN IMAGE ON A MEDIUM

(71) Applicant: Fuji Xerox Co., Ltd., Tokyo (JP)

(72) Inventors: Shota Narumi, Kanagawa (JP); Shinji Sasahara, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/788,381

(22) Filed: Mar. 7, 2013

(65) Prior Publication Data

US 2014/0049552 A1 Feb. 20, 2014

(30) Foreign Application Priority Data

Aug. 16, 2012 (JP) ................................. 2012-180518

(51) Int. Cl.
*G06K 15/02* (2006.01)

(52) U.S. Cl.
USPC ......................................................... 358/1.11

(58) Field of Classification Search
None
See application file for complete search history.

(56) References Cited

U.S. PATENT DOCUMENTS

| 4,768,043 | A | * | 8/1988 | Saito et al. | 347/252 |
| 4,873,537 | A | * | 10/1989 | Ohta | 347/252 |
| 4,912,568 | A | * | 3/1990 | Shimano | 358/3.09 |

FOREIGN PATENT DOCUMENTS

| JP | A-7-314783 | 12/1995 |
| JP | A-10-319789 | 12/1998 |

* cited by examiner

*Primary Examiner* — Jeremiah Bryar
(74) *Attorney, Agent, or Firm* — Oliff PLC

(57) ABSTRACT

An image forming apparatus includes a rasterizing unit that rasterizes character information representing a character in a vector form into a first raster image in which pixels are arranged at a first predetermined density, a generator unit that generates a second raster image in accordance with the first raster image rasterized, and a mask image in which plural pixels are arranged at a second predetermined density, the plural pixels including a first pixel, and a second pixel, a exposure unit that irradiates an image carrier with the beam in response to the second raster image generated, a supply unit that supplies a developer to the image carrier which the exposure unit has irradiated with the beam, and develops on a surface of the image carrier an image responsive to the second raster image, and a transfer unit that transfers the developed image to a medium.

5 Claims, 6 Drawing Sheets

FIG. 5A    FIG. 5B
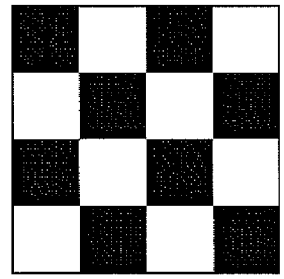  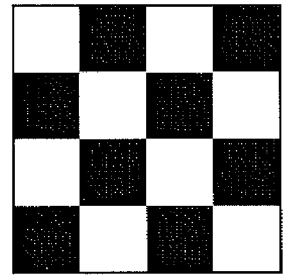
FIG. 6
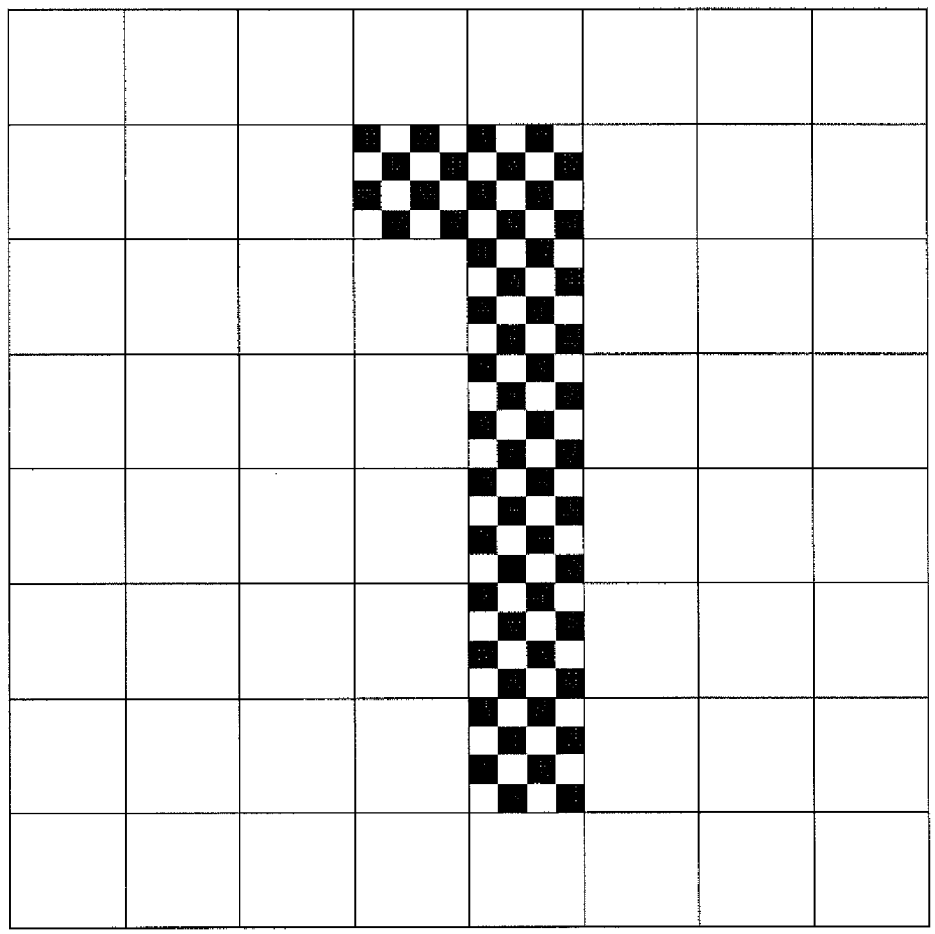

APPARATUS FOR FORMING AN IMAGE ON A MEDIUM

CROSS-REFERENCE TO RELATED APPLICATIONS

This application is based on and claims priority under 35 USC 119 from Japanese Patent Application No. 2012-180518 filed Aug. 16, 2012.

BACKGROUND

Technical Field

The present invention relates to an image forming apparatus, an image forming method, and a non-transitory computer readable medium.

SUMMARY

According to an aspect of the invention, an image forming apparatus is provided. The image forming apparatus includes a rasterizing unit that rasterizes character information representing a character in a form of vector into a first raster image in which pixels are arranged at a first predetermined density, a generator unit that generates a second raster image in accordance with the first raster image rasterized by the rasterizing unit, and a mask image in which plural pixels are arranged at a second predetermined density higher than the first predetermined density, the plural pixels including a first pixel that indicates that a laser beam is emitted in accordance with the first raster image, and a second pixel that indicates that no laser beam is emitted, a exposure unit that irradiates an image carrier with the laser beam in response to the second raster image generated by the generator unit, a supply unit that supplies a developer to the image carrier which the exposure unit has irradiated with the laser beam, and develops on a surface of the image carrier an image responsive to the second raster image, and a transfer unit that transfers to a medium the image developed on the surface of the image carrier. A spacing between a central position of a first pixel and a central position of another first pixel closest to the first pixel with at least one or more second pixels interposed therebetween in the mask image is shorter than a diameter of a circle representing a spot area of the laser beam.

BRIEF DESCRIPTION OF THE DRAWINGS

Exemplary embodiments of the present invention will be described in detail based on the following figures, wherein:

FIGS. 5A and 5B illustrate examples of mask image;

FIG. 6 illustrates an example of a second raster image resulting from calculating a logical product of the mask image;

DETAILED DESCRIPTION

Figure 1:
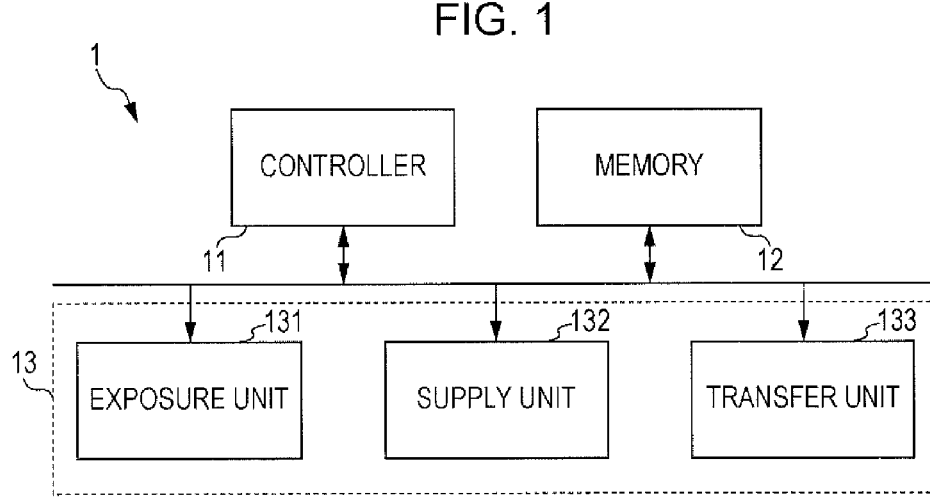
FIG. 1 generally illustrates an image forming apparatus of an exemplary embodiment of the present invention.

FIG. 1 generally illustrates an image forming apparatus 1 of an exemplary embodiment of the present invention. The image forming apparatus 1 includes controller 11, memory 12, and image forming unit 13. The image forming apparatus 1 may further include other elements not illustrated in FIG. 1, such as an operation unit that receives a user operation, a notification unit that notifies a user of a variety of information displayed on a screen, a communication unit that performs communications with an external apparatus, and a transport unit that transports a medium such as a paper sheet. The external apparatus may be a storage device that stores image data, and a reading device that reads an image from an original document and generates image data of the image.

The controller 11 controls the operation of each element in the image forming apparatus 1. The controller 11 includes a processor such as a central processing unit (CPU), and storage devices such as a read-only memory (ROM), and a random-access memory (RAM). The controller 11 executes a program stored on the storage devices or the memory 12, thereby controlling each element in the image forming apparatus 1.

The memory 12 is a mass storage device, such as a hard disk drive, and stores a program and a variety of data read onto the controller 11.

The storage devices included in the controller 11 and the memory 12 may include a removable disk, such as a detachable recording medium.

The image forming unit 13 includes exposure unit 131, supply unit 132, and transfer unit 133. The image forming unit 13 further includes an image carrier having a charge generation layer and a charge conveyance layer, and a charging device that charges the surface of the image carrier. The image carrier is a cylindrical photoconductor drum that rotates about the axis thereof. The exposure unit 131 includes a laser light source (not illustrated) and a polygon mirror (not illustrated). The exposure unit 131, controlled by the controller 11, irradiates with laser light (also referred to as a beam) responsive to the image data representing the image the image carrier charged by the charging device. An amount of light of the beam decreases as the distance from the center of the beam increases. The higher the amount of light of the beam is, the larger the potential on the surface of the image carrier changes. In this way, an electrostatic latent image is held on the image carrier. The image data may be data that the controller 11 has obtained from the external apparatus via the communication unit (not illustrated).

The supply unit 132 includes a toner container containing a two-component developer including black toner, and ferrite powder, an agitator that agitates the developer contained in the toner container, and a development roller arranged at a location facing the image carrier. The development roller includes a magnetic roller and a development sleeve. The magnetic roller is a column-like object that generates a magnetic field. The development sleeve is a cylindrical object manufactured of a nonmagnetic material, and covers the external circumference of the magnetic roller. The development sleeve rotates along the circumferential surface of the magnetic roller about the axis of the magnetic roller. The magnetic roller attracts the magnetic carrier out of the developer supplied from the toner container via the development sleeve, thereby forming a magnetic brush on the surface of the development sleeve. The development sleeve thus holds the developer on the surface thereof.

When a tip of the magnetic brush formed of the magnetic carrier touches the surface of the image carrier, the toner attaches a portion of the surface of the image carrier which the exposure unit 131 has irradiated with the beam, and a development image is formed (developed) on the image carrier. In other words, the supply unit 132 supplies the developer to the image carrier which the exposure unit 131 has irradiated with the beam, thereby forming the development image on the surface of the image carrier. When the exposure unit 131 irradiates the image carrier with the beam, an area of the surface of the image carrier that has undergone a larger change in potential as a result of beam irradiation by the exposure unit 131 has more toner attached thereto.

The transfer unit 133 includes an intermediate transfer belt, a first transfer roller, and a second transfer roller. The first transfer roller causes a predetermined potential difference at a location where the intermediate transfer belt faces the image carrier, and then transfers the development image onto the intermediate transfer belt using the potential difference. The intermediate transfer belt is an endless belt member, and is entrained about plural rollers. At least one of the plural rollers includes a driving unit to transport the belt. In accordance with a potential difference from the potential of the intermediate transfer belt, the second roller transfers the development image transferred on the surface of the intermediate transfer belt to a medium transported by the transport unit. The image is thus formed on the medium.

The image forming apparatus 1 further includes a fixing unit that fixes the image formed on the medium. The fixing unit presses the medium having the image formed thereon while heating the medium. The fixing unit thus fuses the developer transferred on the medium to fix the image to the medium. The medium may be paper, for example. Alternatively, the medium may be a resin sheet. The medium may be any object as long as an image can be recorded on the surface of the object.

Figure 2:
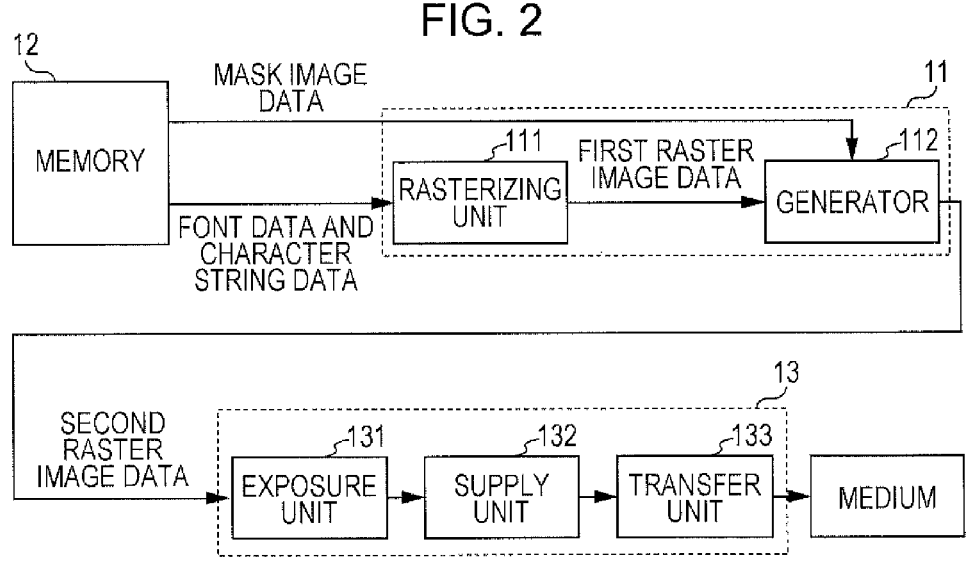
FIG. 2 is a functional block diagram of the image forming apparatus.

FIG. 2 is a functional block diagram of the image forming apparatus 1. The controller 11 functions as a rasterizing unit 111 and a generator 112 by executing the program.

The rasterizing unit 111 rasterizes character information representing a character in a vector form into a first raster image in which pixels are arranged at a first predetermined density. The unit of density used hereinafter is "dpi" (dot per inch) representing the number of dots presented within a width of one inch (=0.0254 meter). The first density may be 600 dpi, for example. The character information includes font data and character string data, stored on the memory 12.

The vector form is a form of a character that is represented continuously using plural functions or parameters. The font data associates a character code identifying a character with a function group or a parameter group that represents the character. The character string data is data representing a character string including arranged plural characters. The character string data includes a character code corresponding to each character, the size of the character, a font name representing a font expressing the character, and information representing the order of these characters.

Figure 3:
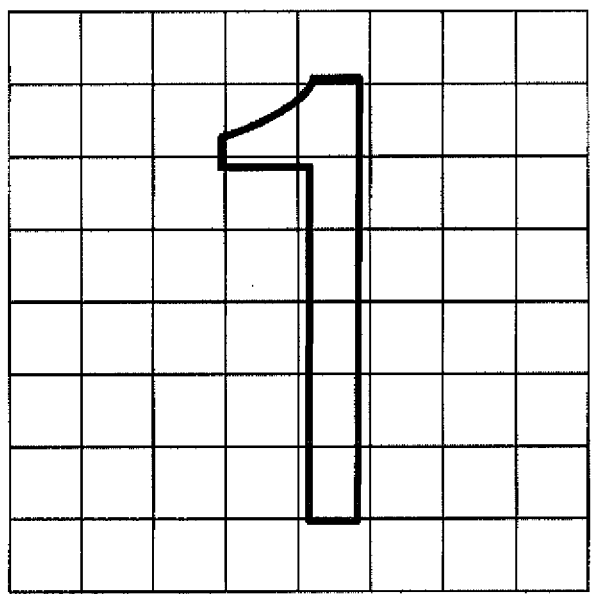
FIG. 3 illustrates an example of a character in a vector form.

FIG. 3 illustrates an example of a character in the vector form. As illustrated in FIG. 3, a shape representing the number "1" is represented using a set of curves and straight lines.

Figure 4:
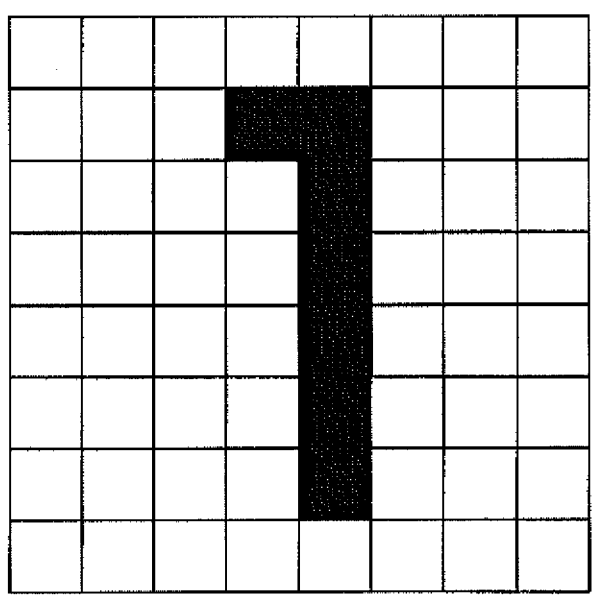
FIG. 4 illustrates an example of a character in a rasterized form.

FIG. 4 illustrates an example of the character in a raster form. As illustrated in FIG. 4, the shape representing the number "1" of FIG. 3 is drawn in the raster form of 8×8 pixels. The rasterizing unit 111 rasterizes the character information representing the form of FIG. 3 into the character in the raster form of FIG. 4, for example.

As illustrated in FIG. 2, the memory 12 stores mask image data in addition to the font data and character string data. The mask image data is data of a mask image that is superimposed on the first raster image representing the character to reduce a character density. The mask image is a set of plural pixels arranged in a grid at a second density higher than the first density. When an electrostatic latent image responsive to the first raster image is formed on the surface of the image carrier, each of the pixels determines whether the exposure unit 131 actually irradiates the surface of the image carrier with the beam. A pixel that the exposure unit 131 actually irradiates with the beam is referred to as a "first pixel." A pixel that the exposure unit 131 does not irradiate with the beam is referred to as a "second pixel." More specifically, the mask image is an image including plural pixels arranged at the second density, and the plural pixels include the first pixel that indicates that the beam is emitted in accordance with the first raster image, and the second pixel that indicates that no beam is emitted. If the first density is 600 dpi, the second density, which is higher than the first density, may be 1200 dpi or 2400 dpi, for example.

FIGS. 5A and 5B illustrate an example of the mask image. The mask image of FIG. 5A includes 4×4 pixels. The topmost and leftmost pixel is the first pixel, and the pixels alternate between the first pixel and the second pixel in a horizontal direction and in a vertical direction. The mask image is thus a "checkerboard pattern." The mask image of FIG. 5B is identical to the mask image of FIG. 5A in that the mask image includes 4×4 pixels, and is in a checkerboard pattern with the first pixel alternating with the second pixel. The mask image of FIG. 5B is different from the mask image of FIG. 5A in that the topmost and leftmost pixel is the second pixel.

The mask images of FIGS. 5A and 5B have 4×4 pixels as one unit, and is identical in size to each of the 8×8 pixels of FIG. 4. More specifically, the second density as the density of pixels in the mask image of FIG. 5 is four times as high as the first density of the first raster image of FIG. 4.

As illustrated in FIG. 2, the generator 112 calculates a logical product of the first raster image and the mask image in accordance with the first raster image data representing the first raster image rasterized by the rasterizing unit 111 and the mask image data read from the memory 12. The generator 112 then generates the second raster image indicated by the calculated logical product. The second raster image data representing the second raster image is transferred from the controller 11 to the image forming unit 13.

FIG. 6 illustrates an example of the second raster image generated from the logical product of the first raster image and the mask image. The generator 112 calculates the logical product from the first raster image representing the character in the raster form of FIG. 4 and the mask image of FIG. 5A. The second raster image resulting from calculating the logical product becomes the raster image of FIG. 6.

As illustrated in FIG. 2, the exposure unit 131 in the image forming unit 13 irradiates with the beam the surface of the image carrier in accordance with the second raster image data transferred. The supply unit 132 supplies the developer to the image carrier which the exposure unit 131 has irradiated with the beam, and forms on the surface of the image carrier the development image responsive to the second raster image. The transfer unit 133 transfers the development image formed on the surface of the image carrier to a medium. In this way, the development image responsive to the second raster image is formed on the medium such as recording paper.

Figure 7A:
FIGS. 7A through 7C illustrate the potential on the surface of an image carrier with no mask image used.
Figure 7B:
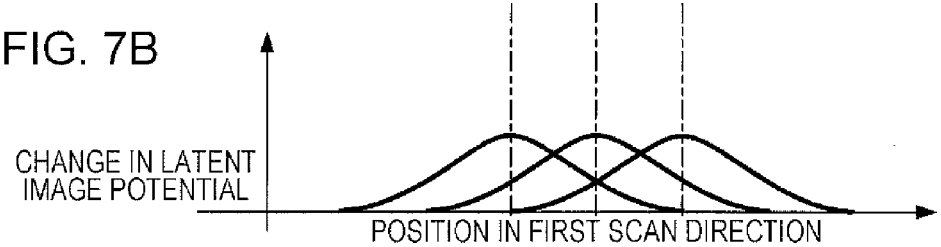
Figure 7C:

Described next is the relationship between a spacing between pixels in the mask image and the potential of the electrostatic latent image formed on the surface of the image carrier in response to the second raster image generated based on the mask image. FIGS. 7A through 7C illustrate the potentials on the surface of the image carrier when the logical product of the mask image is not calculated. Three squares illustrated in FIG. 7A are some of the pixels forming the first raster image. Hatched squares represent pixels corresponding to locations which the beam irradiates with the image carrier. In FIGS. 7B and 7C, the abscissa represents position in a first scan direction, and the ordinate represents potential of an electrostatic latent image. FIG. 7B illustrates potentials of the surface of the image carrier that vary depending on the beam which irradiates each pixel. FIG. 7C illustrates a potential that results from combining the potentials of the beams.

The image forming apparatus 1 may emit the beam in accordance with the first raster image without calculating the logical product of the mask image. If pixels, out of the pixels of the first raster image, causing the beam to be emitted, are adjacent to each other in location as illustrated in FIG. 7A, the beam irradiates the locations corresponding to the adjacent pixels. The potential on the surface of the image carrier changes with a peak at a position corresponding to the center of each of the three pixels as illustrated in FIG. 7B. Changes in the potential on the surface of the image carrier caused by the radiation of the beam at the three locations are combined on the surface of the image carrier. As a result, the potential of the electrostatic latent image is distributed as a result of the summing of the beams as illustrated in FIG. 7C.

Figure 8A:
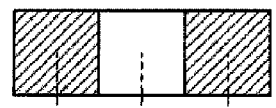
FIGS. 8A through 8C illustrate the potential on the surface of the image carrier with a mask image used.
Figure 8B:
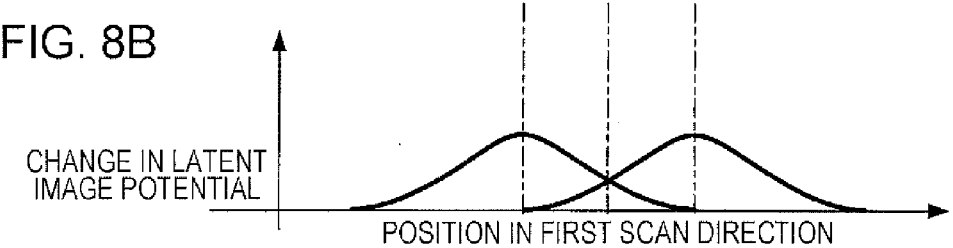
Figure 8C:
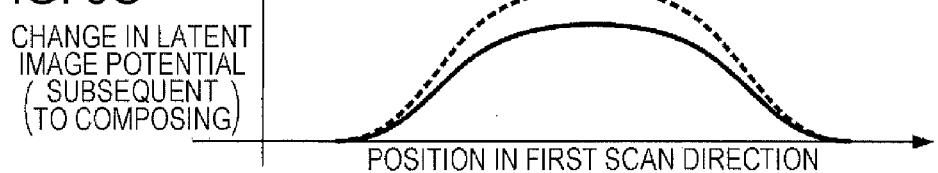

FIGS. 8A through 8C illustrate the potential on the surface of the image carrier when the logical product of the mask image is calculated. Three squares illustrated in FIG. 8A are some of the pixels forming the second raster image that is generated based on the logical product of the first raster image and the mask image. Hatched squares represent pixels corresponding to locations where the beam irradiates the image carrier while a blank square represents a pixel corresponding to a location where the beam does not irradiate the image carrier. In FIGS. 8B and 8C, the abscissa represents position in the first scan direction, and the ordinate represents the potential of an electrostatic latent image. FIG. 8B illustrate potentials of the surface of the image carrier that vary depending on the beam which irradiates each pixel. A solid curve in FIG. 8C represents a potential into which the potentials varied with the beam are combined. A broken curve in FIG. 8C corresponds to the curve representing the potential of FIG. 7C.

The image forming apparatus 1 calculates the logical product of the first raster image and the mask image, thereby generating the second raster image. The image forming apparatus 1 then irradiates with the beam in accordance with the second raster image. Out of the pixels forming the second raster image, pixels corresponding to locations which the beam irradiates are not adjacent to each other as illustrated in FIG. 8A. As illustrated in FIG. 8B, the irradiation beams are decimated. Changes in the potential caused by the beam irradiating two locations are combined on the surface of the image carrier. As a result, the potential of the electrostatic latent image is distributed as a result of combination of the beams as illustrated in FIG. 8C. Since the use of the mask image decimates the number of beams irradiating the surface of the image carrier, the change in the potential of the electrostatic latent image becomes reduced as illustrated in FIG. 8C.

Figure 9:
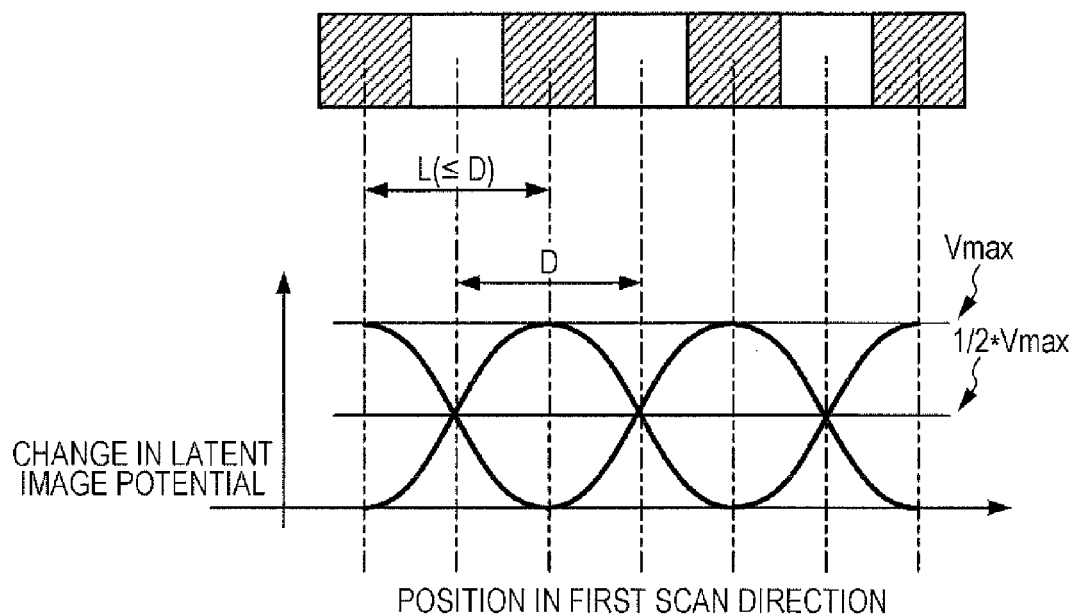
FIG. 9 illustrates a spacing between pixels forming the mask image.

Described below is a relationship between a spacing between the central positions of the first pixels in the mask image and the beam spot. The beam spot refers to an area where the potential varies within the beam irradiating a location of the image carrier. The beam spot is a circle, and the potential at the central position of the beam spot is highest, and the potential along a concentric circle decreases in the electrostatic latent image as the radius of the concentric circuit increases from the central position. FIG. 9 illustrates the spacing between the pixels forming the mask image. As illustrated in FIG. 9, a spacing L is a separation between the central position of a first pixel and a next first pixel closest to the first pixel with at least one second pixel interposed therebetween in the mask image. As illustrated in FIG. 9, a diameter D represents the diameter of a circle that is formed by connecting locations where the light intensity of the beam is half as high as the light intensity at the central position of the beam spot that has irradiated the central position of the first pixel in the mask image.

The beam irradiates the central position of the first pixel in the mask image, and a change occurs in the potential on the beam spot on the surface of the image carrier. The change in the potential becomes a maximum Vmax at the central position of the beam spot. As the distance increases from the central position, a change in the potential decreases. At a location where a change in the potential becomes half as high as Vmax, i.e., Vmax/2, a beam having a light intensity half the beam intensity at the central position of the beam spot is emitted. If the locations where the beam having the light intensity half as high as the beam intensity at the central position is emitted are connected, a resulting shape becomes a circle on the surface of the image carrier. The diameter D of the circle is half width (full width at half maximum).

Figure 10:
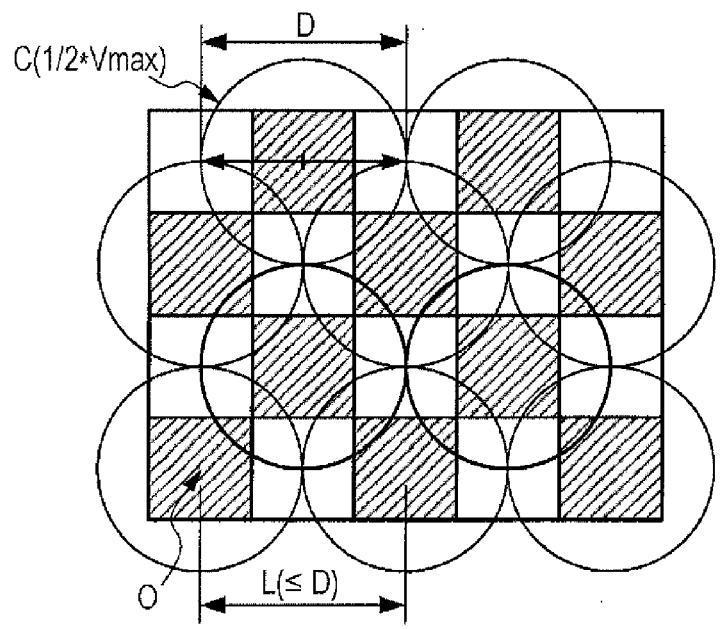
FIG. 10 illustrates a relationship between the mask image and a laser beam spot.

The mask image is preset so that the spacing L is equal to or shorter than the diameter D as illustrated in FIG. 9. FIG. 10 illustrates a relationship between the mask image having the first pixels and the second pixels arranged in a checkerboard pattern and the beam spots. As illustrated in FIG. 10, the beam spots are positioned at the central positions of the respective first pixels in the mask image. If a circle having a radius equal to the half width is drawn at each beam spot, the inside of each second pixel falls within the inside of any circle in the mask image. Inside the second pixel, a change in potential at least half as high as a change in potential at the central position of the first pixel occurs.

Since the spacing L is equal to or shorter than the diameter D in this way, a change in potential occurs at a location where the second pixel of the mask image causes the beam not to irradiate. For this reason, an area where a character is to be in a solid fill pattern is free from a blank portion where any toner fails to attach. The above arrangement controls a tendency for a character to become illegible, in comparison with the case without such arrangement. The beam spot is a circle in the above discussion. The beam spot is not necessarily a regular circle but may be an ellipse. In such a case, the area of the beam spot may be defined as a circle inscribed on the ellipse.

FIGS. 11A through 11F illustrate an example of a development image of a character formed on the medium by the image forming apparatus 1 of an exemplary embodiment of the present invention. In the following discussion, point (pt) is used as a unit of character size.

Figure 11A:
FIGS. 11A through 11F illustrate examples of development images of a character formed on a medium.

FIG. 11A illustrates a development image of a kanji character in block letter of 5 pt directly formed on the medium (this process is referred to as an unprocessed operation). FIG.

Figure 11B:
Figure 11C:
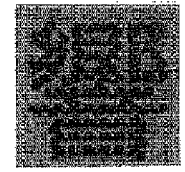
Figure 11D:
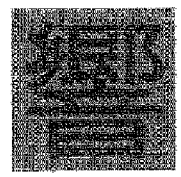
Figure 11E:
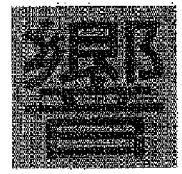
Figure 11F:
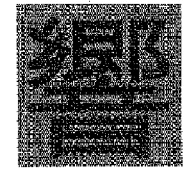

11B illustrates a resulting development image on the medium which is mask image composed by the image forming apparatus 1 of the exemplary embodiment of the present invention (this process is referred to as a mask image composed operation). The image forming apparatus 1 composes the development image by combining the kanji character in block letter of 5 pt with the mask image. FIG. 11C illustrates a development image which is formed on the medium by performing 80-percent halftone processing on the kanji character in block letter of 5 pt (this process is referred to as a "80-percent halftone processed operation"). FIGS. 11D through 11F respectively represent the development images of FIGS. 11A through 11C with the character sizes thereof changed to 10 pt.

The development image of FIG. 11C has coarse outlines and is difficult to read. The development image of FIG. 11B is easy to read in comparison with the development image of FIG. 11C, and has an outline almost as clear as that of the development image of FIG. 11A. The development image of FIG. 11E is easy to read in comparison with the development image of FIG. 11F, and has an outline almost as clear as that of the development image of FIG. 11D.

Figure 12:
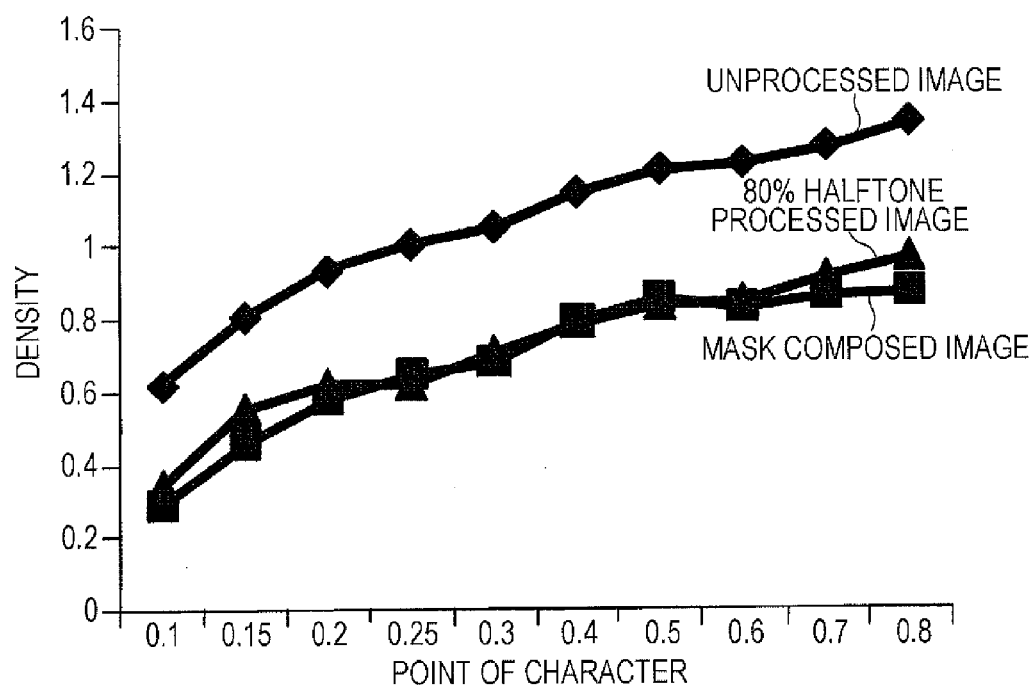
FIG. 12 illustrates a change in character density caused by composition of mask images.

FIG. 12 illustrates a change in line density caused by composition with the mask image. The inventor of this invention has changed the size of line width from 0.1 pt to 0.8 pt, has formed development images represented by the changed lines on the medium using three types of operations including an "unprocessed operation," a "mask image composing operation," and an "80-percent halftone processing operation," and has measured toner density (line density). The density of line formed through the "mask image composing operation" is lower than the density of line formed through the "unprocessed operation," and is almost as high as the density of line formed through the "80-percent halftone processing operation."

If the "mask image composing operation" has been performed by the image forming apparatus 1 of the exemplary embodiment of the present invention, the density becomes almost as low as the density of the character obtained through the "80-percent halftone processing operation" while the outline of the character becomes clearer than the outline of the character obtained through the "80-percent halftone processing operation."

The exemplary embodiment has been discussed. The exemplary embodiment may be modified as described below. Modifications described below may be combined.

First Modification

In the exemplary embodiment, the spacing L is equal to or shorter than the diameter D corresponding to the half width of the beam spot. The spacing L is not limited to this size. The spacing L may be equal to or shorter than the diameter of the beam spot. If the spacing L indicating a distance between the central position of one first pixel and the central position of another first pixel closest to the one first pixel with at least one second pixel interposed therebetween is equal to or shorter than the diameter of the beam spot in the mask image, at least a change in potential occurs on the surface of the image carrier even at a location corresponding to within the second pixel of the mask image. For this reason, an area where a character is to be in a solid fill pattern is free from a blank portion where any toner fails to attach.

Second Modification

In the exemplary embodiment, the generator 112 calculates the logical product of the mask image and the first raster image regardless of the size of the character. Alternatively, the generator 112 may calculate the logical product of the first raster image and the mask image that is different depending on the size of a character represented by the character information. In such a case, the ratio of the first pixels to the mask image may be varied in response to the size of the character. More specifically, the ratio of the first pixels to the mask image may be set to be lower as the size of the character represented by the character information becomes larger.

Third Modification

A program executed by the controller 11 in the image forming apparatus 1 may be supplied in a recorded state on a computer readable recording medium. Such recording media include a magnetic recording medium such as a magnetic tape or a magnetic disk, an optical disk such as an optical recording medium, or magneto-optical recording medium, and a semiconductor memory. The program may be downloaded via a communication line such as the Internet. Not only CPU but also one of a variety of devices may be used for the controller 11. For example, a dedicated processor may be used for the controller 11.

Fourth Modification

In the exemplary embodiment, the generator 112 calculates the logical product of the first raster image and the mask image, and then generates the second raster image indicated by the resulting logical product. Alternatively, The generator 112 may calculate the second raster image through another calculation method.

For example, the first pixel has information that indicates a ratio at which the exposure unit 131 actually emits the beam. If a pixel of interest in the mask image out of the pixels of the first raster image is a first pixel, the generator 112 may multiply the pixel by the ratio, thereby generating the second raster image. More specifically, if a given pixel of the first raster image corresponds to the beam radiation at an intensity of 100, the pixel in the mask image corresponding to the given pixel may be a first pixel having a ratio of 80%. As a result of calculation of the generator 112, the pixel corresponding to the given pixel in the second raster image corresponds to the irradiation beam at an intensity of 80. Any method is acceptable as long as the generator 112 generates the second raster image in accordance with the first raster image and the mask image.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
    a rasterizing unit that rasterizes character information representing a character in a vector form into a first raster image in which pixels are arranged at a first predetermined density;
    a generator unit that generates a second raster image in accordance with the first raster image rasterized by the rasterizing unit, and a mask image in which a plurality of pixels are arranged at a second predetermined density higher than the first predetermined density, the plurality of pixels including a first pixel that indicates that a beam is emitted in accordance with the first raster image, and at least one second pixel that indicates that no beam is emitted;

an exposure unit that irradiates an image carrier with the beam in response to the second raster image generated by the generator unit;

a supply unit that supplies a developer to the image carrier which the exposure unit has irradiated with the beam, and develops on a surface of the image carrier an image responsive to the second raster image; and a transfer unit that transfers to a medium the image developed on the surface of the image carrier, wherein a spacing between a central position of a first pixel and a central position of another first pixel closest to the first pixel with the at least one second pixel interposed therebetween in the mask image is shorter than a diameter of a circle representing a spot of the beam.

2. The image forming apparatus according to claim 1, wherein the spacing is shorter than a diameter of a circle that is formed by connecting positions where an intensity of the beam is half as high as an intensity of the beam at a central position of the beam spot.

3. The image forming apparatus according to claim 1, wherein the generator unit generates a raster image represented by a logical product by calculating a logical product of the first raster image and a mask image that is different depending on a size of a character represented by the character information, and wherein a ratio of the first pixels to the mask image becomes lower as the size of the character represented by the character information becomes larger.

4. An image forming method comprising:

rasterizing character information representing a character in a vector form into a first raster image in which pixels are arranged at a first predetermined density;

generating a second raster image in accordance with the first raster image rasterized, and a mask image in which a plurality of pixels are arranged at a second predetermined density higher than the first predetermined density, the plurality of pixels including a first pixel that indicates that a beam is emitted in accordance with the first raster image, and at least one second pixel that indicates that no beam is emitted;

irradiating an image carrier with the beam in response to the second raster image generated;

supplying a developer to the image carrier which the beam has irradiated, and developing on a surface of the image carrier an image responsive to the second raster image; and transferring to a medium the image developed on the surface of the image carrier, wherein a spacing between a central position of a first pixel and a central position of another first pixel closest to the first pixel with the at least one second pixel interposed therebetween in the mask image is shorter than a diameter of a circle representing an area of a beam spot of the beam.

5. A non-transitory computer readable medium storing a program causing a computer to execute a process for forming an image, the process comprising:

rasterizing character information representing a character in a vector form into a first raster image in which pixels are arranged at a first predetermined density;

generating a second raster image in accordance with the first raster image rasterized, and a mask image in which a plurality of pixels are arranged at a second predetermined density higher than the first predetermined density, the plurality of pixels including a first pixel that indicates that a beam is emitted in accordance with the first raster image, and at least one second pixel that indicates that no beam is emitted;

irradiating an image carrier with the beam in response to the second raster image generated;

supplying a developer to the image carrier which the beam has irradiated and developing on a surface of the image carrier an image responsive to the second raster image; and transferring to a medium the image developed on the surface of the image carrier, wherein a spacing between a central position of a first pixel and a central position of another first pixel closest to the first pixel with the at least one second pixel interposed therebetween in the mask image is shorter than a diameter of a circle representing a spot of the beam.

\* \* \* \* \*